(12) United States Patent
Salomon et al.

(10) Patent No.: US 10,409,991 B2
(45) Date of Patent: Sep. 10, 2019

(54) TECHNIQUE FOR SECURE DATA LOADING TO A SYSTEM COMPONENT

(71) Applicants: Airbus Operations GmbH, Hamburg (DE); Cassidian CyberSecurity GmbH, Ottobrunn (DE)

(72) Inventors: Maxim Salomon, Hamburg (DE); Timo Warns, Hamburg (DE)

(73) Assignee: AIRBUS CYBERSECURITY GMBH, Taufkirchen (DE)

(*) Notice: Subject to any disclaimer, the term of this patent is extended or adjusted under 35 U.S.C. 154(b) by 189 days.

(21) Appl. No.: 15/382,947

(22) Filed: Dec. 19, 2016

(65) Prior Publication Data
US 2017/0177871 A1    Jun. 22, 2017

(30) Foreign Application Priority Data

Dec. 18, 2015 (EP) .................................. 15201028

(51) Int. Cl.
*G06F 21/00* (2013.01)
*G06F 21/57* (2013.01)
(Continued)

(52) U.S. Cl.
CPC .......... *G06F 21/572* (2013.01); *G06F 9/4406* (2013.01); *G06F 13/385* (2013.01);
(Continued)

(58) Field of Classification Search
CPC .... G06F 13/385; G06F 13/4022; G06F 21/51; G06F 21/57; G06F 21/572; G06F 21/64; G06F 21/74; G06F 21/79; G06F 21/85; G06F 2221/031; G06F 2221/2105; G06F 9/4406; G06F 21/44; G06F 21/445; G06F 21/50; G06F 21/55; H04L 9/3247
See application file for complete search history.

(56) References Cited

U.S. PATENT DOCUMENTS 9,788,183 B1 * 10/2017 Fitzpatrick .............. H04W 4/90
2002/0178295 A1 * 11/2002 Buczek ................... H04L 41/22
709/250
(Continued)

FOREIGN PATENT DOCUMENTS

EP        3079334 A1 * 10/2016    ......... H04L 63/1441

OTHER PUBLICATIONS

European Search Report, dated May 2, 2016, priority document.

*Primary Examiner* — Edward Zee
*Assistant Examiner* — Ka Shan Choy
(74) *Attorney, Agent, or Firm* — Greer, Burns & Crain, Ltd.

(57) ABSTRACT

A USB device for secure data loading to a system component, such as of an aircraft. The USB device is operable in a mass storage mode and in a non-mass storage mode. The USB device initially operates in the non-mass storage mode upon startup and comprises a storage for storing data to be loaded to the system component, a processor and a memory, wherein the memory contains instructions executable by the processor such that the USB device is operable to perform a security check on the data to be loaded to the system component, and switch, upon the security check, from the non-mass storage mode to the mass storage mode to provide the data for loading to the system component.

12 Claims, 2 Drawing Sheets

(51) Int. Cl.
  *G06F 9/4401* (2018.01)
  *G06F 13/38* (2006.01)
  *G06F 13/40* (2006.01)
  *G06F 21/85* (2013.01)
  *H04L 9/32* (2006.01)
  *G06F 21/51* (2013.01)
  *G06F 21/64* (2013.01)
  *G06F 21/74* (2013.01)
  *G06F 21/79* (2013.01)

(52) U.S. Cl.
  CPC .......... *G06F 13/4022* (2013.01); *G06F 21/51* (2013.01); *G06F 21/57* (2013.01); *G06F 21/64* (2013.01); *G06F 21/74* (2013.01); *G06F 21/79* (2013.01); *G06F 21/85* (2013.01); *H04L 9/3247* (2013.01); *G06F 2221/031* (2013.01); *G06F 2221/2105* (2013.01)

(56) References Cited

U.S. PATENT DOCUMENTS

| | | | |
|---|---|---|---|
| 2006/0015661 A1* | 1/2006 | Dietz | H04N 1/21 710/62 |
| 2006/0136996 A1 | 6/2006 | Wang et al. | |
| 2008/0005409 A1* | 1/2008 | Kolokowsky | G06F 13/385 710/62 |
| 2009/0044003 A1* | 2/2009 | Berthiaume | G06F 21/57 713/100 |
| 2009/0307452 A1* | 12/2009 | Hahn | G06F 21/57 711/164 |
| 2010/0115201 A1 | 5/2010 | Hsu | |
| 2013/0198520 A1* | 8/2013 | Excoffier | G06F 21/572 713/173 |
| 2016/0292429 A1* | 10/2016 | Manville | G06F 17/30094 |

\* cited by examiner

TECHNIQUE FOR SECURE DATA LOADING TO A SYSTEM COMPONENT

CROSS-REFERENCES TO RELATED APPLICATIONS

This application claims the benefit of the European patent application No. 15201028.6 filed on Dec. 18, 2015, the entire disclosures of which are incorporated herein by way of reference.

BACKGROUND OF THE INVENTION

The present disclosure generally relates to secure data loading. More particularly, the present disclosure relates to a USB device for secure data loading to a system component, a method for secure data loading to a system component using a USB device, as well as to a computer program for executing the method.

In the aircraft industry and other industries, data loading techniques are used to apply software or configuration updates to system components, such as to the components of an aircraft system or to the components of an industrial control system. For maintenance of aircraft systems, for example, it is known to employ Portable Data Loaders (PDLs) or other types of data loading workstations to transfer data loads to respective components of the system. PDLs and other data loading workstations may retrieve data loads from external media, such as floppy, CD, DVD and USB storage, and perform data loads to the system components from these media accordingly. Many aircraft systems also support data loading from USB storage devices themselves. In these cases, a system component comprises a USB interface for connection with a USB storage device and for retrieval of data loads therefrom.

In general, a system or system component needs to be secured against defective data loads. While techniques for securing data loads are generally known, some of these techniques may be complex or may involve high operational overhead.

SUMMARY OF THE INVENTION

It is thus an object of the present disclosure to provide a technique for secure data loading that avoids one or more of these, or other, problems.

According to a first aspect, a USB device for secure data loading to a system component, such as of an aircraft, is provided. The USB device is operable in a mass storage mode and in a non-mass storage mode. The USB device initially operates in the non-mass storage mode upon startup and comprises a storage for storing data to be loaded to the system component, a processor and a memory, wherein the memory contains instructions executable by the processor such that the USB device is operable to perform a security check on the data to be loaded to the system component, and switch, upon the security check, from the non-mass storage mode to the mass storage mode to provide the data for loading to the system component.

The USB device may be a self-contained computer having its own computing resources and may thus also be referred to as a USB computer. In one variant, the USB device may be a USB stick and the USB stick may be configured as a System on a Chip (SoC). The USB device may comprise a processor (e.g., CPU), a memory (e.g., RAM), a storage (e.g., a micro SD card) and an operating system (e.g., Linux) installed thereon. The USB device may further comprise a USB interface through which it may be plugged into (possibly via a USB cable) a USB port of the system component or a host computer to establish connectivity therewith. The USB device may be automatically powered on when it is plugged into the system component or the host computer and when it is supplied with power therefrom. The USB device may thus start up and boot its operating system to reach an operable state. USB devices of the described type are generally known. An example is the so called "USB armory" developed by Inverse Path which is provided in the form of a USB stick.

The USB device may switch between a mass storage mode and a non-mass storage mode. In the mass storage mode, the USB device may emulate a USB mass storage device so that the USB device is detectable as a USB mass storage device when connected to the system component or the host computer via its USB interface. In the non-mass storage mode, the USB device may not be detectable as a USB mass storage device. In this mode, the USB device may not be detectable as a device at all, or it may be detectable as some other form of device, such as, for example, as an independent (e.g., networked) computer. Upon startup, the USB device initially operates in the non-mass storage mode so that the USB device is not detectable as a USB mass storage device upon establishing connection to the system component or the host computer.

The system component may be a component of a technical system which is software-based, i.e., which comprises software to perform its functions. Examples of such systems may comprise a system of an aircraft, a system of another means of transport, or an industrial control system, such as, for example, a control system employed in a manufacturing plant's final assembly line (FAL) for manufacturing an aircraft or another means of transport. To support data loading from the USB device, the system component may comprise a USB port into which the USB device may be plugged (possibly via a USB cable). The system component may be configured to mount a file system stored on the storage of the USB device when the USB device is connected to the system component. Further, the system component may be configured to retrieve (e.g., copy) a data load from the USB device.

The host computer may come in the form of a Portable Data Loader (PDL) or another data loading workstation, such as, for example, a system engineer's laptop computer, or the like. The host computer may comprise a USB port into which the USB device may be plugged (possibly via a USB cable). A PDL or another data loading workstation may be useful in cases when the system component does not support data loading via a USB interface itself, but only via other types of interfaces. In these cases, the PDL or other data loading workstation may be configured to retrieve (e.g., copy) a data load from the USB device and perform data loading (e.g., forward the data load) to the system component via an interface supported by the system component accordingly.

In order to make sure that the data to be loaded to the system component is secure (i.e., free from malicious content or other deficient content), the USB device may perform a security check on the data. The security check may automatically be performed when the USB device starts up, e.g., when it is plugged into the system component or the host computer. Performing the security check on the data may include at least one of checking the data for malicious software, applying a cryptographic signature check on the data, verifying a correct version of the data, and deleting files having non-allowed file properties from the data.

Checking the data for malicious software may include scanning the data or the whole storage of the USB device for malicious software. Such scanning may comprise scanning a file system of the storage of the USB device, for example, on viruses, Trojan horses, spyware or other types of malicious software. In this way, it can be ensured that the data is not virus contaminated or infected by other types of malicious software before providing the data for loading to the system component.

Applying a cryptographic signature check on the data may include verifying a digital signature applied to the data, such as a digital signature based on a public key algorithm, for example. In this way, integrity and authenticity of the data can be verified and, thus, it can be made sure that the data originates from the correct source and has not been modified after signing.

Verifying a correct version of the data may include checking the data against configuration data for conformance purposes. The configuration data may be provided, for example, through a configuration file or a configuration database and may be available at the USB device itself or may be retrieved from an external source. By the conformance check, it can be made sure that the data has been selected correctly before storing it on the USB device and, thus, it can be prevented that wrong software or a wrong version of data is loaded to the system component.

Deleting files having non-allowed file properties from the data may be performed according to a predetermined definition of file properties that are not allowed. For example, files having file extensions of executable file types, such as ".exe", ".app", ".autorun", ".zip", or the like, may be removed. In this way, potentially dangerous files may be excised out of the data before providing the data for loading to the system component.

Upon performing the security check, the USB device may switch from the non-mass storage mode to the mass storage mode to provide the data for loading to the system component. At this point, the USB device may become detectable by the system component or the host computer (depending on which of both the USB device is connected to) as a USB mass storage device so that the data may be retrieved (e.g., copied) by the system component or the host computer from the USB device, respectively. In case the USB device is connected to a system component, data loading may be performed at this point. In case the USB device is connected to a host computer, the host computer may perform the actual data loading to the system component using the retrieved data (e.g., forward the data to the system component), as described above.

In one implementation, the memory of the USB device may contain instructions executable by the processor such that the USB device is operable to switch from the non-mass storage mode to the mass storage mode only if the security check has been successful. Thus, access to the data may only be provided to the system component or the host computer if it has been verified that the data is secure.

The USB device may comprise a visual indicator and the memory of the USB device may further contain instructions executable by the processor such that the USB device is operable to provide a visual indication using the visual indicator indicating a result of the security check. The visual indicator may, for example, be given by one or more LEDs provided at the USB device. In this case, the visual indication may include, for example, flashing the one or more LEDs in green or blue color when the result of the security check indicates that the data is secure or, otherwise, flashing the one or more LEDs in red color when the result of the security check indicates that the data is not secure or otherwise deficient. It will be understood that other types of visual indications are conceivable, such as a small display capable of outputting a message indicating a result of the security check, for example.

For the purpose of configuring the security check to be performed, the memory of the USB device may further contain instructions executable by the processor such that the USB device is operable to provide an interface for advance configuration of the security check. In one implementation, the interface may be a web interface which may provide convenient access to available configuration options of the security check from a host computer. It will be understood that, in other implementations, other types of interfaces may be used, such as, for example, a console interface operable by a command-line interface from the host computer. The interface may be accessible via a (e.g., IP-based) network connection which may be virtually simulated over a USB protocol, such as Ethernet over USB, for example. The network connection may be established simultaneously to the USB mass storage connection over the same USB interface.

Prior to performing the security check on the data, the data must be stored to the storage of the USB device. In one example, storing the data to the storage of the USB device may take place remote from the system component, such as at a system engineer's workplace, for example. Thus, prior to connecting the USB device to the system component or to the host computer, the data may be copied to the storage of the USB device from another host computer, such as a system engineer's workstation. In one example, the data may be originally stored in a data loading repository hosted by a server (or server infrastructure) and may be loaded and copied to the USB device via the other host computer, such as the system engineer's workstation. Once stored on the USB device, the USB device may be disconnected from the other host computer and be shipped or carried to the location of the system component, where it may be plugged into the system component or the host computer for the purpose of loading the data to the system component, as described above.

In order to support remote data loading, the memory of the USB device may in one implementation contain instructions executable by the processor such that the USB device is operable to retrieve the data from a data loading repository via a secure connection and to store the retrieved data in the storage of the USB device. Similarly, the memory of the USB device may contain instructions executable by the processor such that the USB device is operable to retrieve information for verifying the correct version of the data, such as the configuration data referred to above, from a configuration database via a secure connection. In this way, the data and/or configuration data may be loaded by the USB device itself and stored to the storage of the USB device when the USB device is connected to the system component or the host computer. The secure connection may be established by the USB device and may be realized as a VPN connection, TLS/SSL connection, or the like.

In one implementation, the USB device may comprise an I/O interface for this purpose and the secure connection may thus be established via the I/O interface. The I/O interface may be a general-purpose input/output, GPIO, interface and the GPIO interface, in turn, may be used to connect a peripheral device to the USB device. For example, the GPIO interface may be used to connect a Wi-Fi module via a daughter board to the USB device and the secure connection may thus be established by the USB device via the Wi-Fi module. On board of an aircraft, for example, network connectivity may then be established via an in-flight WLAN provided on board the aircraft. It will be understood that other types of peripheral devices may be used for the same purpose, such as, for example, a Bluetooth interface, an NFC interface, or the like.

In another implementation, in case the USB device is connected to (possibly via a USB cable) a host computer, the secure connection may be established by the USB stick via the host computer, i.e., the USB device may use network connectivity of the host computer to establish network connectivity to the data loading repository and/or the configuration database itself.

According to a second aspect, a method for secure data loading to a system component, such as of an aircraft, using a USB device for storing data to be loaded to the system component is provided. The USB device is operable in a mass storage mode and in a non-mass storage mode, wherein the USB device initially operates in the non-mass storage mode upon startup. The method comprises performing a security check on the data to be loaded to the system component, and switching, upon the security check, from the non-mass storage mode to the mass storage mode to provide the data for loading to the system component.

The method may be performed by the USB device according to the first aspect. All apparatus features described herein with reference to the first aspect may thus also be embodied as functions, services or steps in the method of the second aspect.

According to a third aspect, a computer program product is provided. The computer program product comprises program code portions for performing the method of the second aspect when the computer program product is executed on a computing device. The computing device may be the USB device according to the first aspect. The computer program product may be stored on a computer readable recording medium, such as a semiconductor memory, DVD, CD-ROM, or the like.

All of the aspects described herein may be implemented by hardware circuitry and/or by software. Even if some of the aspects are described herein with respect to the USB device, these aspects may also be implemented as a method or as a computer program for performing or executing the method. Likewise, aspects described as or with reference to a method may be realized by suitable components in the USB device, or by means of the computer program.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from the specific details.

Figure 1:
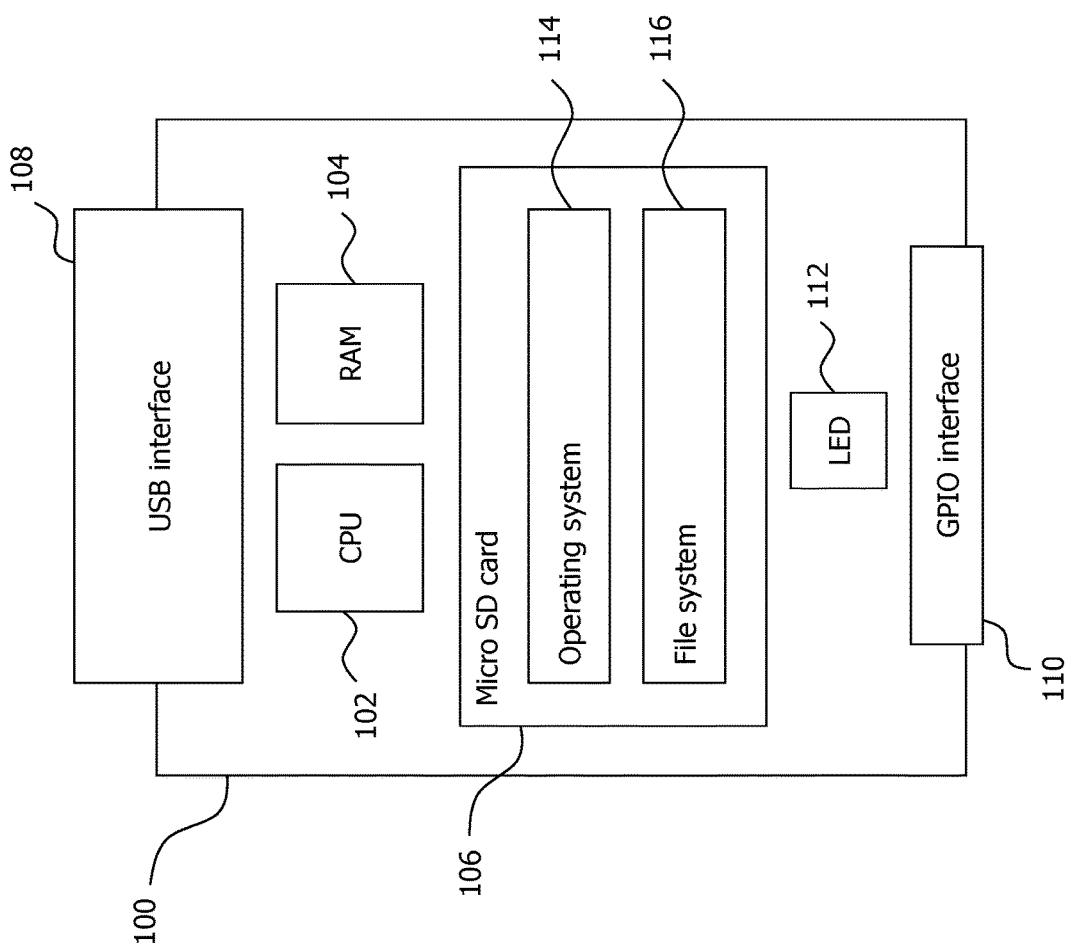
FIG. 1 schematically illustrates a composition of a USB device for secure data loading to a system component according to the present disclosure.

FIG. 1 schematically illustrates an exemplary composition of a USB device 100 which can be used for secure data loading to a system component. The USB device 100 comes in the form of a USB stick. The USB device 100 is configured as a System on a Chip (SoC), i.e., the USB device 100 is a self-contained computer having its own computing resources and being capable of running as an independent USB computer. The USB device 100 comprises a processor 102, a memory 104, a storage 106, a USB interface 108, a general purpose input-output (GPIO) interface 110, and an LED 112.

The memory 104 of the USB stick 100 may contain, or be loaded from the storage 106 by, instructions executable by the processor 102 such that the USB stick 100 is operable to perform the functions described herein.

The storage 106 of the USB device 100 is a micro SD card in the given example, but may be any other type of permanent memory which may be installed in the USB device 100. In the example of FIG. 1, an operating system 114 for operating the USB device 100 as a USB computer is stored on the storage 106. The operating system 114 may be a Linux operating system having a minimalistic kernel, for example. The storage 106 further comprises a file system 116 which may be under control of the operating system 114 and in which the data to be loaded to the system component may be stored.

The USB interface 108 of the USB device 100 may be used to plug the USB device 100 into a USB port of a system component or a host computer in order to establish connectivity therewith. The USB device 100 may be automatically powered on when it is plugged into the system component or the host computer and when it is supplied with power therefrom. Once the USB device 100 is plugged in, it may initially boot the operating system 114 to reach an operable state.

The USB device 100 may switch between a mass storage mode and a non-mass storage mode. In the mass storage mode, the USB device 100 may emulate a USB mass storage device so that the USB device 100 is detectable as a USB mass storage device when connected to the system component or the host computer via the USB interface 108. In the non-mass storage mode, the USB device may not be detectable as a USB mass storage device. In this mode, the USB device 100 may not be detectable as a device at all, or it may be detectable as some other form of device (i.e., other than a USB mass storage device), such as, for example, as an independent (e.g., networked) computer. Upon startup, the USB device 100 initially operates in the non-mass storage mode so that the USB device 100 is not detectable as a USB mass storage device after plugging it in at the system component or the host computer.

The system component may be a component of a technical system which is software-based, i.e., which comprises software to perform its functions. Examples of such systems may comprise a system of an aircraft, a system of another means of transport, or an industrial control system, such as, for example, a control system employed in a manufacturing plant's final assembly line (FAL) for manufacturing an aircraft or another means of transport. The system component may be configured to mount the file system 116 of the USB device 100 when the USB device 100 is connected to the system component and when the USB device 100 operates in the mass storage mode. Further, the system component may be configured to retrieve (e.g., copy) a data load from the USB device 100.

The host computer may come in the form of a Portable Data Loader (PDL) or another data loading workstation, such as, for example, a system engineer's laptop computer, or the like. A PDL or another data loading workstation may be useful in cases when the system component does not support data loading via a USB interface itself, but via other types of interfaces only. In these cases, the PDL or other data loading workstation may be configured to retrieve (e.g., copy) a data load from the USB device 100 and perform data loading (e.g., forward the data load) to the system component via an interface supported by the system component accordingly.

The GPIO interface 110 of the USB device 100 provides an I/O interface which may be used to establish network connectivity to other devices. In particular, the GPIO interface 110 may be used to connect a peripheral device to the USB device 100. For example, the GPIO interface may be used to connect a Wi-Fi module via a daughter board to the USB device 100 and network connectivity may thus be established via the Wi-Fi module. On board of an aircraft, for example, network connectivity may then be established via an in-flight WLAN provided on board the aircraft. It will be understood that other types of peripheral devices may be employed for the same purpose, such as, for example, a Bluetooth interface, an NFC interface, or the like.

Figure 2:
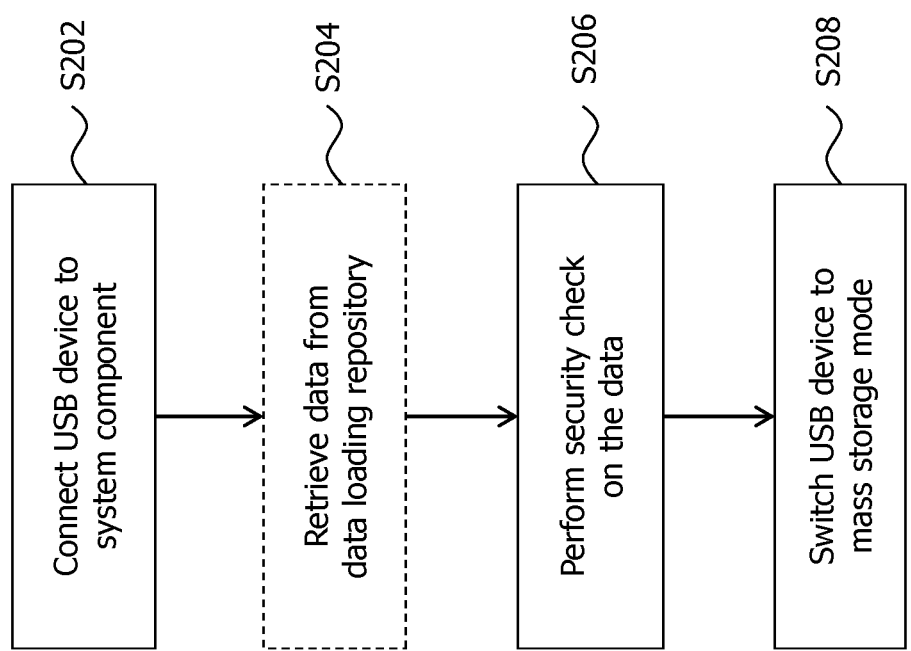
FIG. 2 schematically illustrates a flowchart of a method which may be performed by the USB device of FIG. 1.

FIG. 2 schematically illustrates a flowchart of a method for secure data loading to a system component which may be performed by the USB device 100. The method begins at step S202, at which the USB device 100 is plugged into a system component or a host computer. The USB device 100 is thus supplied with power, starts up and boots the operating system 114 to reach an operable state. At this point, the USB device 100 is operated in the non-mass storage mode, i.e., it is not yet detectable by the system component or the host computer as a USB mass storage device.

The data to be loaded to the system component may have been stored to the file system 116 of the USB device 100 at an earlier point of time and at a place remote from the system component, such as at a system engineer's workplace, for example. The data may have been copied to the USB device 100 from another host computer, such as a system engineer's workstation. The data may have been originally stored in a data loading repository hosted by a server (or server infrastructure) and may have been loaded and copied to the USB device 100 via the system engineer's workstation.

Alternatively, if the data has not yet been copied to the USB device 100, the USB device 100 may retrieve, in an optional step S204, the data from a data loading repository via a secure connection. At the same time, the USB device 100 may retrieve configuration data for verifying a correct version of the data from a remote configuration database via a secure connection. In this way, the data and/or configuration data may be loaded and stored by the USB device 100 itself when the USB device 100 is connected to the system component or the host computer.

The secure connection may be established by the USB device 100 via the GPIO interface 110 (and via a peripheral device connected thereto, such as a Wi-Fi module, as described above) and may be realized as a VPN connection, TLS/SSL connection, or the like. Alternatively, if the USB device 100 is connected to a host computer the secure connection may be established by the USB stick 100 via the host computer, i.e., the USB device 100 may use network connectivity of the host computer to establish network connectivity to the data loading repository and/or the configuration database itself.

In step S206, the USB device 100 then performs a security check on the data in order to make sure that the data to be loaded to the system component is secure (i.e., free from malicious content or other deficient content). The security check may automatically be performed when the USB device 100 is plugged into the system component or the host computer. Performing the security check on the data may include at least one of checking the data for malicious software, applying a cryptographic signature check on the data, verifying the correct version of the data, and deleting files having non-allowed file properties from the data.

Checking the data for malicious software may include scanning the data or the file system 116 of the USB device 100 for malicious software. Such scanning may comprise scanning the file system 116, for example, on viruses, Trojan horses, spyware or other types of malicious software. In this way, it can be ensured that the data is not virus contaminated or infected by other types of malicious software before providing the data for loading to the system component.

Applying a cryptographic signature check on the data may include verifying a digital signature applied to the data, such as a digital signature based on a public key algorithm, for example. In this way, integrity and authenticity of the data can be verified and, thus, it can be made sure that the data originates from the correct source and has not been modified after signing.

Verifying a correct version of the data may include checking the data against configuration data for conformance purposes. The configuration data may be available at the USB device 100 itself or may be retrieved from a remote configuration database. By the conformance check, it can be ensured that the data has been selected correctly before storing it on the USB device 100 and, thus, it can be prevented that wrong software or a wrong version of data is loaded to the system component.

Deleting files having non-allowed file properties from the data may be performed according to a predetermined definition of file properties that are not allowed. For example, files having file extensions of executable file types, such as ".exe", ".app", ".autorun", ".zip", or the like, may be removed. In this way, potentially dangerous files may be excised out of the data before providing the data for loading to the system component.

For the purpose of configuring the security check to be performed, the USB device may provide a web interface providing convenient access to available configuration options of the security check from a host computer. The web interface may be accessible via a (e.g., IP-based) network connection which may be virtually simulated over a USB protocol, such as Ethernet over USB, for example. The network connection may be established simultaneously to the USB mass storage connection over the USB interface 108.

In step S208, upon performing the security check, the USB device 100 switches from the non-mass storage mode to the mass storage mode to provide the data for loading to the system component. At this point, the USB device 100 may become detectable by the system component or the host computer (depending on which of both the USB device 100 is connected to) as a USB mass storage device so that the data may be retrieved (e.g., copied) from the USB device 100 to the system component or the host computer, respectively. In case of a host computer, the data may be used by the host computer to perform data loading (e.g., forward the data) to the system component, as described above. The USB device 100 may switch from the non-mass storage mode to the mass storage mode only if the security check has been successful. In this way, access to the data is only provided to the system component or the host computer if it has been verified that the data is secure.

The USB device 100 may also provide a visual indication using the LED 112 to indicate a result of the security check. The visual indication may include, for example, flashing the LED 112 in green or blue color when the result of the security check indicates that the data is secure or, otherwise, flashing the LED 112 in red color when the result of the security check indicates that the data is not secure or otherwise deficient. In the former case, a user, such as a system engineer, is informed of the fact that the data is secure and, in the latter case, the user is alerted that potentially dangerous or deficient content has been found on the USB device 100. In the former case, the data load may then be completed as planned and, in the latter case, the user may abort data loading or resolve the situation in accordance with a predetermined error handling procedure.

As has become apparent from the above description, the USB device of the present disclosure may be employed for securely performing data loading to a system component. Through the security check performed upon startup of the USB device, the USB device may ensure that no malicious or deficient content is exposed to the system component or to the host computer it is connected to. Security checks are seamlessly integrated into the media used for data transfer. The USB device of the present disclosure may thus contribute to securing the transport chain of a data load from a data loading repository to a system component. Generally, attacks may be encountered before reaching the system component, thus, preventing costs arising from potential incidents that require further investigations and recovery actions on the system or system component concerned. In cases in which the system component itself supports a USB interface, the USB device of the present disclosure may entirely replace the need for Portable Data Loaders (PDLs) or other data loading workstations which are generally associated with higher operational overhead and more complex to secure against malicious attacks. Costs for software and configuration management and corresponding development efforts may thus be reduced.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A USB device for secure data loading to a system component, the USB device being configured to operate in a mass storage mode wherein the USB device is detectable by the system component as a USB mass storage device and in a non-mass storage mode wherein the USB device is not yet detectable by the system component as a mass storage device, the USB device initially operating in the non-mass storage mode upon startup and comprising:
   a storage for storing data to be loaded to the system component via the mass storage mode;
   a processor and a memory, the memory containing instructions executable by the processor such that the USB device is configured to:
   perform, independently of the system component, a security check on the data to be loaded from the USB device as a USB mass storage device to the system component; and
   switch, upon the security check, from the non-mass storage mode to the mass storage mode to provide the data for loading to the system component by the system component mounting to a file system of the USB device in the mass storage mode;
   wherein performing the security check on the data is automatic on startup of the USB device when the USB device is plugged into the system component, and includes at least one of:
   checking the data for malicious software,
   applying a cryptographic signature check on the data,
   verifying a correct version of the data, and
   deleting files having non-allowed file properties from the data.

2. The USB device of claim 1, wherein the USB device is a USB stick.

3. The USB device of claim 1, wherein the memory further contains instructions executable by the processor such that the USB device is operable to:
   switch from the non-mass storage mode to the mass storage mode only if the security check has been successful.

4. The USB device of claim 1, wherein the USB device comprises a visual indicator, and wherein the memory further contains instructions executable by the processor such that the USB device is configured to:
   provide a visual indication using the visual indicator indicating a result of the security check.

5. The USB device of claim 1, wherein the memory further contains instructions executable by the processor such that the USB device is configured to:
   provide a web interface via a host computer separate from the system component for advance configuration of the security check.

6. The USB device of claim 1, wherein the memory further contains instructions executable by the processor such that the USB device is configured to:
   retrieve the data from a data loading repository via a secure connection; and
   store the retrieved data in the storage.

7. The USB device of claim 1, wherein the memory further contains instructions executable by the processor such that the USB device is configured to:
   retrieve information for verifying the correct version of the data from a configuration database via a secure connection.

8. The USB device of claim 6, wherein the USB device comprises an I/O interface and wherein the secure connection is established via the I/O interface.

9. The USB device of claim 8, wherein the I/O interface is a general-purpose input/output (GPIO) interface, wherein the GPIO interface is connected to a Wi-Fi module via a daughter board, and wherein the secure connection is established via the Wi-Fi module.

10. The USB device of claim 6, wherein the USB device is connected to a host computer and wherein the secure connection is established via the host computer.

11. A method for secure data loading to a system component using a USB device for storing data to be loaded to the system component, the USB device being operable in a mass storage mode wherein the USB device is detectable by the system component as a USB mass storage device and in a non-mass storage mode wherein the USB device is not yet detectable by the system component as a mass storage device, the USB device initially operating in the non-mass storage mode upon startup, the method comprising:
- performing, by the USB device and independently of the system component, a security check on the data stored on the USB device and to be loaded from the USB device as a USB mass storage device to the system component; and
- switching, by the USB device, upon the security check, from the non-mass storage mode to the mass storage mode to provide the data for loading to the system component by the system component mounting to a file system of the USB device in the mass storage mode;
- wherein performing the security check on the data is automatic on startup of the USB device when the USB device is plugged into the system component, and includes at least one of:

checking the data for malicious software,
applying a cryptographic signature check on the data,
verifying a correct version of the data, and
deleting files having non-allowed file properties from the data.

12. A non-transitory computer-readable medium comprising executable instructions stored thereon which, when executed on a USB device, configures the USB device to carry out a method for secure data loading to a system component using a USB device for storing data to be loaded to the system component, the USB device being operable in a mass storage mode wherein the USB device is detectable by the system component as a USB mass storage device and in a non-mass storage mode wherein the USB device is not yet detectable by the system component as a mass storage device, the USB device initially operating in the non-mass storage mode upon startup, the method comprising:
- performing, by the USB device and independently of the system component, a security check on the data to be loaded from the USB device as a USB mass storage device to the system component; and
- switching, by the USB device, upon the security check, from the non-mass storage mode to the mass storage mode to provide the data for loading to the system component by the system component mounting to a file system of the USB device in the mass storage mode;
- wherein performing the security check on the data is automatic on startup of the USB device when the USB device is plugged into the system component, and includes at least one of:

checking the data for malicious software,
applying a cryptographic signature check on the data,
verifying a correct version of the data, and
deleting files having non-allowed file properties from the data.

* * * * *